March 24, 1942.   W. V. JOHNSON   2,277,111
LOW-BOUNCE CONTACT-DEVICES AND THE LIKE
Filed Aug. 16, 1940    2 Sheets-Sheet 1
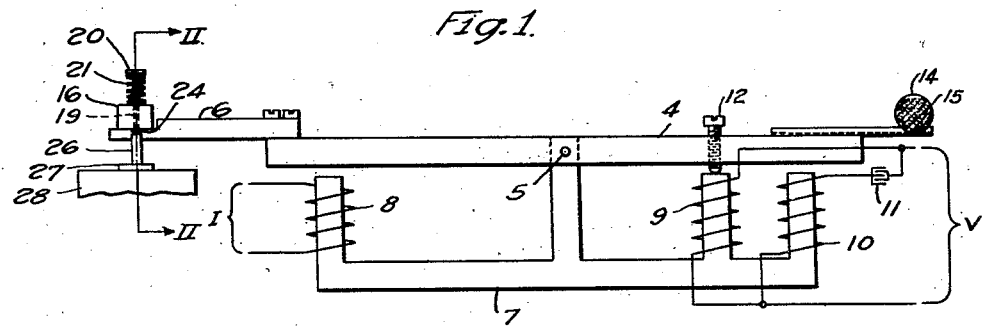
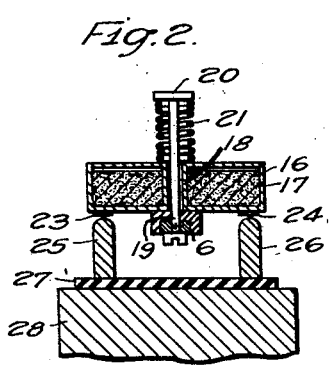
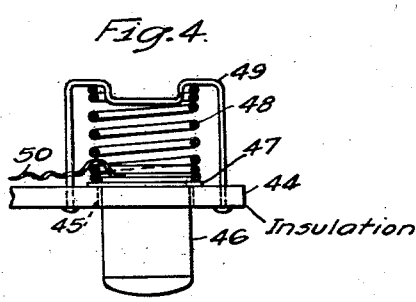
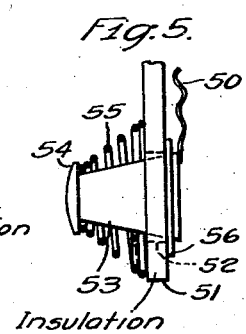
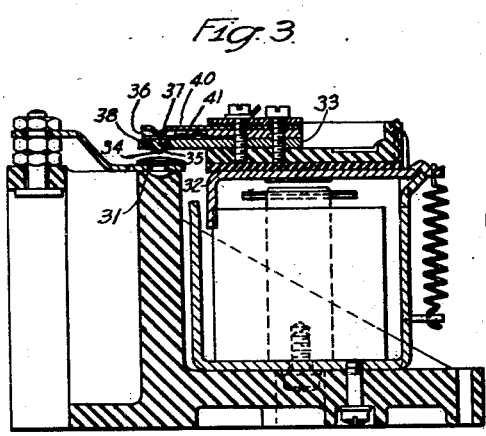
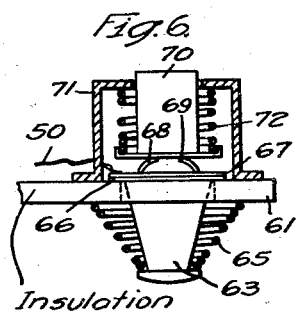
INVENTOR
Welton V. Johnson.

March 24, 1942.  W. V. JOHNSON  2,277,111
LOW-BOUNCE CONTACT-DEVICES AND THE LIKE
Filed Aug. 16, 1940  2 Sheets-Sheet 2
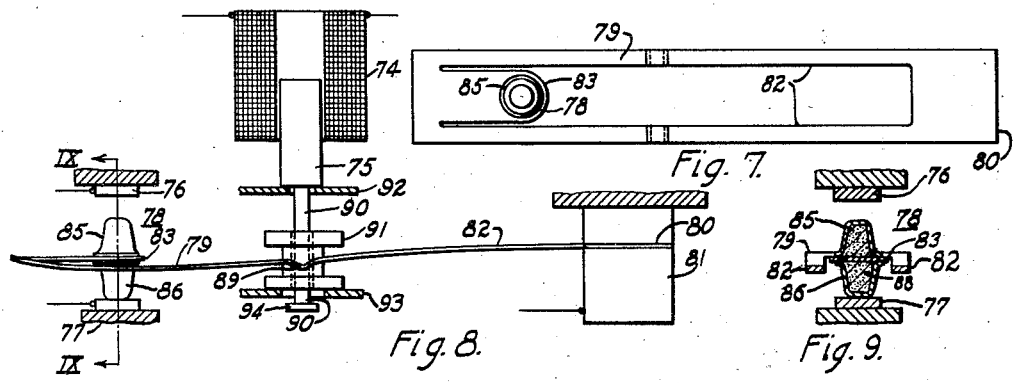
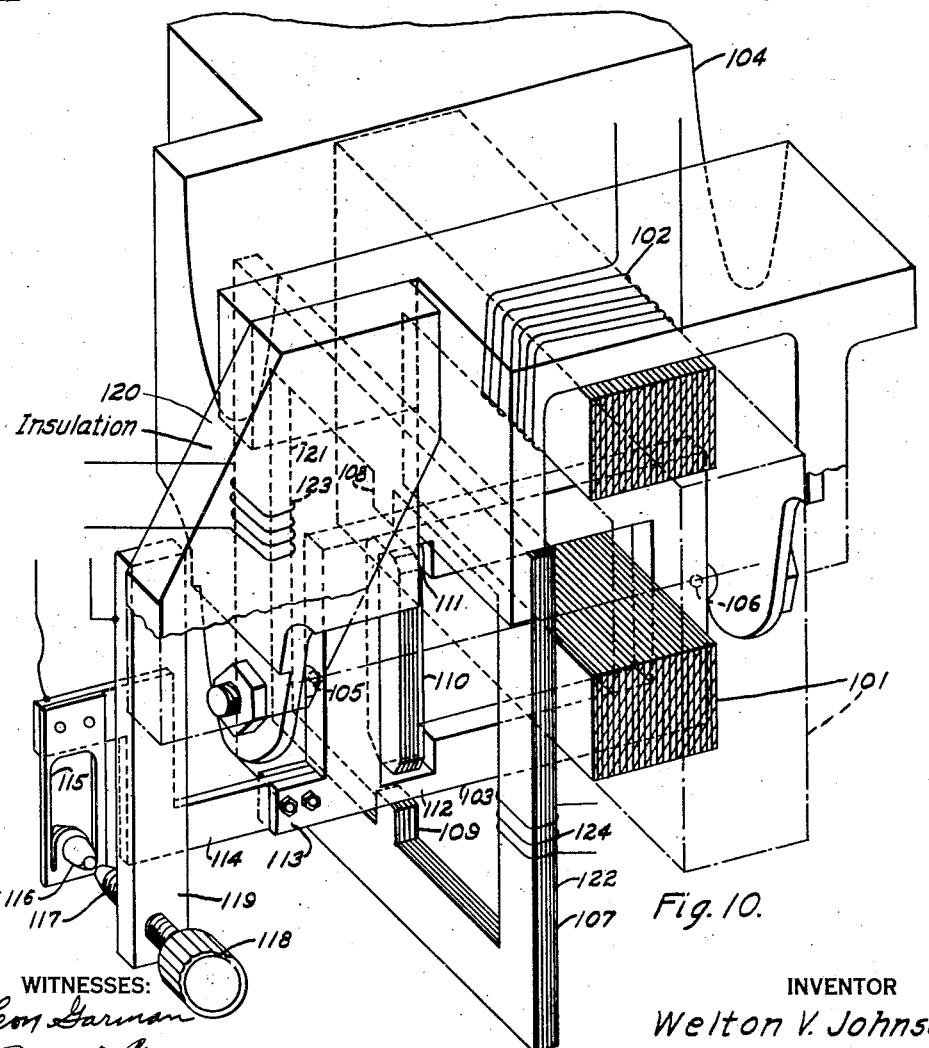
INVENTOR
Welton V. Johnson.
BY
ATTORNEY Patented Mar. 24, 1942

2,277,111

UNITED STATES PATENT OFFICE 2,277,111

LOW-BOUNCE CONTACT DEVICE AND THE LIKE

Welton V. Johnson, Short Hills, N. J., assignor to Westinghouse Electric & Manufacturing Company, East Pittsburgh, Pa., a corporation of Pennsylvania Application August 16, 1940, Serial No. 352,915

18 Claims. (Cl. 200—166)

My invention relates to very satisfactory low-bounce or substantially non-bouncing or non-vibrating movable elements of machines, and it has more particular relation to absolutely non-chattering contact-devices such as are particularly suitable for use in contactors and in quick-acting relays, although my invention is also applicable to latches and other varied devices which are subjected to hammer-blows or even milder forms of vibration.

An object of my invention is to utilize the damping properties of a capsule containing a flowable material composed of molecular aggregates which are capable of frictionally shifting with respect to one another, said flowable material being preferably a loose granular material of hard-metal powdered particles, such as crushed tungsten granules or powder, which has been found to be more efficacious in its operation than fluids and which is also more advantageous than fluids from the standpoint of ease of handling in manufacturing operations.

A primary object of my invention is to provide a contact-bounce absorber which will not only enormously reduce contact-wear, but which, when applied to quick-acting relays, will make, at the very least, a 50- or 100-fold increase in the quickness of operation of the relay. By "quickness of operation," I do not mean the time of initial contact but the length of time taken from the initial contact until the relative motion between the two respective contacts entirely ceases.

An important feature of my invention is the provision of a bounce-reducing means which is not only present and effective to reduce or to prevent the first bounce after impact, but which is also still present and effective after the time when the first bounce tends to occur, so as to quench, dampen or prevent subsequent bouncing or chattering.

One of the more important fields of application of the invention is in protective relaying systems for the quick clearing of faults on transmission lines, and it has been an object in many modern protective systems of this nature to seek to obtain a relaying system which is capable of making a complete determination in regard to the magnitude and the direction of a fault within one cycle on a 60-cycle transmission line, the relay-operation being utilized for the purpose of controlling circuit-breakers which are capable of clearing the fault within times ranging from 3 to 6 or 8 cycles. Ordinarily a chain of operations involving several relays is required before the final relay operates the breaker trip-coil. Any bouncing at all, of the first or intermediate low-current-carrying contacts, delays the action considerably.

In old-style fault-clearing systems, where the operating times of the circuit-breakers were very much longer, the relaying time was also much longer, and no particular attention had to be paid to the bouncing of the relay-contacts before they finally came to rest. In the modern systems for the quick clearing of faults, however, and particularly in those systems in which one-cycle relay-operation is attempted, it has been found that the response of the circuit which is closed by a relay-contact must be obtained from the first moment of the contact, and cannot wait until the second or third bounce, or even a later bounce of the contact.

My invention provides the best known non-bouncing contact—in fact one which can easily be so perfectly designed as to have no slightest trace of any bouncing or chattering which can be detected with a special high-speed oscillograph which can measure time-intervals as small as 7 micro-seconds, and which can detect hundreds of bouncings or chatterings in an ordinary or non-damped light-weight electrical contact-device. It will readily be seen that this invention constitutes a very important and vital part of a wide range of relays—auxiliary relays as well as protective relays—and contactors, manufactured by the Westinghouse Electric & Manufacturing Company.

A still further object of my invention is to provide numerous novel structural details for electric contact devices, either in addition to, or independently of, the tungsten-powder-filled capsule which at present constitutes my preferred embodiment, whereby a low-bounce or substantially non-bouncing contact-making operation is achieved or materially contributed to.

With the foregoing and other objects in view, my invention consists in the structures, elements, combinations and methods hereinafter described and claimed, and illustrated in the accompanying drawings, wherein:

Figure 1 is a somewhat diagrammatic side view of one form of my invention as applied to a high-speed impedance-relay of a type which is commonly utilized in the quick clearing of faults on transmission lines;

Fig. 2 is a detailed view of the contact elements, on a section plane indicated by the line II—II of Fig. 1;

Fig. 3 is a sectional view of another form of embodiment of my invention as applied to a clapper type of relay;

Figs. 4 to 6 are side views of other forms of low-bounce contacts;

Fig. 7 is a plan view of a movable contact-member according to my invention, mounted on a special compound leaf-spring in accordance with a preferred form of embodiment;

Fig. 8 is a partly diagrammatic side-elevational view showing the application of the structural arrangement of Fig. 7 to an electrical contactor switch;

Fig. 9 is a somewhat enlarged cross-sectional view showing the internal construction of the movable contact-member, the cross-section plane being indicated by the lines IX—IX in Figs. 7 and 8; and Fig. 10 is a somewhat diagrammatic view in perspective, illustrating the application of my invention to a directional relay-element.

As shown in Fig. 1, my invention is applied to a high-speed impedance-relay of a type having a balanced beam 4, which is centrally pivoted at 5, and which carries a fairly stiff, unyielding contact-carrying plate or arm 6 of insulating material at one end. A magnetizable frame-structure 7 is associated with the balanced beam 4 in such manner that the beam is subjected to an operating force developed by a current-coil 8 which is energized from a source of current which is indicated by the symbol I, and restraining forces which are developed by two out-of-phase voltage coils 9 and 10 which are energized from a suitable voltage-source which is indicated by the symbol V, a phase-difference being produced in the two voltage-coils 9 and 10 by means of an impedance device such as a capacitor 11 connected in series with the coil 10. This is a well-known type of sensitive relay which is normally held in its non-operative position, against a backstop 12 as shown, by reason of the restraint of the voltage-coils, but which, at a certain ratio of current to voltage, is actuated in response to the pull of the current-coil 8. Such relays have heretofore proved quite troublesome as a result of the bouncing of the electrical contact which is closed by the operation of the relay.

According to the embodiment of my invention shown in Fig. 1, I have done two things to reduce the bouncing of the relay shown in this figure. The first, but not the most important thing, is that I damp the vibrations of the balanced-beam 4 itself by mounting thereon a thin-walled capsule 14 at the extreme end of the beam so that its motion is as great as possible. This capsule 14 is more or less filled with crushed tungsten powder 15, or other dense, hard, heat-resistant, chemically stable, jagged granular damping-material which is capable of shifting its particles in such manner as to develop friction as a result of such shifting, so that the resultant friction will damp the vibrations of the balanced-beam 4. The jagged edges of the grains which constitute the tungsten powder contribute very considerably to the friction which they develop when the particles shift over one another, which is in sharp contrast to the operation of smooth balls which are displaced so as to relatively easily or frictionlessly shift over each other. The hardness of the tungsten also makes it possible for the powder-particles or grains to retain their jagged edges in service, so as to resist the pounding and rounding effects to which particles of a softer material, such as lead, would succumb in the course of continued use. The mechanical strength of the tungsten also enables it to resist the pulverizing operation which would be brought about after continued use, in the case of a considerably weaker material such as sand. The use of a dry powder is also advantageous, as any liquid on the surfaces of such small particles would cause them to stick together and not shift over each other, in response to jarring, as is required in order to develop friction.

Preferably, the capsule 14 itself is of a light weight, so that the mass of the powder-filled capsule will be made up almost entirely of the mass of the powder, because the powder is the material which is effective in damping the vibrations. In this connection, the high density of the tungsten is advantageous, since it makes it possible to utilize a relatively small container or capsule 14 for a given mass of powder. A less dense powder would require a larger container, and a larger container would require thicker container-walls and hence a reduction in the ratio of the mass of the powder divided by the mass of the container.

The capsule 14 may be either completely filled or only partially filled with the powder 15, excellent results being obtained with capsules which are about nine-tenths filled with powder.

Substantially bounce-free contact-operation cannot always be obtained in the fullest possible measure without damping the beam-element 4 as above described, in addition to damping the actual contact-making elements which are to be subsequently described. The beam-damping effect results from the shifting of the tungsten particles 15 when the motion of the beam is suddenly checked or altered, as by an impact, and this shifting of particles causes friction which damps or opposes resilient rebounding or readjustments commonly known as bouncing or chattering.

In addition to the first-named expedient of damping the movable beam 4, there is a second expedient of which I have adopted, and which is absolutely essential if contact-chattering is to be really eliminated. This second expedient for damping vibrations, in the form of embodiment of my invention shown in Fig. 1, is a new form of directly-damped contact-device which is carried by the movable contact-arm 6. As shown in Figs. 1 and 2, the movable contact-carrying arm 6 carries a light-weight capsule or container 16 which should be made of thin-walled, light-weight material, such as thin-gauge sheet-brass, as shown on a larger scale in Fig. 2.

The brass container 16 is filled or nearly filled with a flowable friction-material such as crushed tungsten powder 17.

Tungsten is utilized not only because of its mass or density (being about 2.4 times as heavy as iron), but also because of its high melting point, which makes it possible to solder or otherwise fabricate the brass container without fusing the particles of the powdered material. Tungsten is also chemically stable, readily obtainable in powdered form, and reasonably low-priced.

The brass container 16 has a central perforation which is lined with a thin-walled pipe 18 which is utilized to mount the container on a guiding pin 19 which is carried by the movable contact-carrying arm 6. The guiding pin 19 is provided with a head 20, and the container 16 is normally pressed lightly against the top of the contact-carrying arm 6 by means of a helical spring 21 encircling the pin 19 and disposed between the head 20 and the top of the container 16.

The bottom of the container 16 is provided with two contact-members 23 and 24 of any suitable contact-making material. These contact-members constitute the movable contact-elements of the contact device, and they are normally separated from two stationary contact devices 25 and 26 which are relatively heavy or massive as compared to the movable contact device or container 16 and its associated parts 17, 23 and 24. The stationary contact-devices 25 and 26 are not only relatively heavy, but are mounted in a substantially unyielding manner, an exaggerated form of unyielding mounting being illustrated in Fig. 2 as comprising a thin insulating sheet 27 surmounting a massive metallic base-member 28.

It is an important feature of my invention that the stationary contact-member or members, such as 25 and 26 in Fig. 2, including their mountings, shall be heavy, or of a high inertia, as compared with the mass or inertia of the movable contact member or capsule which contains the powder or other friction material, and that the stationary contact member should be rigidly mounted so as to be relatively unyielding, because my bounce-absorbing powder or other flowable friction-material is the most effective when it is given as severe a blow as possible, which is accomplished by causing all of the change in motion to take place in the movable-contact capsule rather than having some of it transferred to the stationary contact-members.

It will be readily understood that my invention is susceptible of embodiment in a number of different forms, one alternative form being illustrated in Fig. 3, wherein my invention is shown as being applied to a clapper-type electromagnetic relay having a stationary contact-member 31 which is composed essentially of a heavy gauge bar-material of substantially nonflexible or nonyielding metal, and a movable clapper member or armature 32 carrying an insulatedly mounted, non-yielding, movable contact-carrying arm 33 which carries, near its end, a small metal capsule 34 which is made of a very thin-walled cup-shaped shell 35 which is soldered to a back-plate 36. This capsule 34 is filled or nearly filled with crushed tungsten powder 37. The capsule 34 is mounted so as to be capable of sliding toward and away from the stationary contact member 31, through a hole 38 in the movable contact-carrying arm 33. The back-plate 36 constitutes a stop-member which is normally pressed against the top side of the movable contact-carrying arm 33, or the side of the contact-carrying arm furthest away from the stationary contact-member 31, by means of a light leaf-spring 40 which is carried by the movable contact-carrying arm 33, the electric current being kept substantially out of the spring 40, so as to avoid overheating, by means of a flexible shunt, pigtail or jumper-connection 41.

In either form of embodiment of my invention, as shown in Figs. 2 and 3, when the movable contact-carrying arm 6 or 33, as the case may be, is moved toward the stationary contact-devices 25—26 or 31, as the case may be, the contact will be made by the relatively light capsule, which will thereupon settle upon the stationary contact-member or members, substantially without any bouncing, like a bag of sand, while the movable contact-carrying arm 6 or 33 will continue to move, thereby compressing the light capsule-actuating spring 21 or 40, as the case may be. When the tungsten powder, inside of the capsule, is subjected to a shock, the particles of tungsten slide over one another, causing friction, which absorbs the energy of the impact. It will be appreciated that the light capsule-actuating springs 21 and 40 exert only a small force as compared with the forces which control the positions of the movable contact-carrying arms 6 and 33.

While the movable contact-member is the principal offender, from the standpoint of bouncing, in electrical contact devices of the prior art the vibration or bouncing of the beam or other movable operating element is a significant contributing factor, frequently constituting a serious offender in causing the bouncing or chattering of the electrical contact. It will be observed that the balanced-beam 4 of Fig. 1 carries, at its extreme rear end, in fact, mounted on an extension of the beam, so as to have the greatest possible movement, a vibration-absorbing capsule 14 of its own, said capsule being filled with tungsten powder 15 or other frictional damping means, whereby the bouncing of the beam is prevented or greatly reduced. In accordance with my invention, a vibration-absorbing capsule such as the capsule 14 in Fig. 1 may be added to any of the beams or movable elements or contact-carrying arms of any of the other figures.

Several very excellent forms of low-bounce movable-contact members embodying my invention are shown in Figs. 4 to 7 in different forms of embodiment.

In Fig. 4 the movable contact-carrying arm 44 of insulating material is perforated, at 45, to loosely receive a capsule 46 which may be similar to the capsules 16 and 34 of Figs. 2 and 3. The capsule 46 has a shouldered head 47, engaged by a helical spring 48, the upper end of which is engaged by a U-shaped bracket 49 carried by the arm 44. When the lower end of the capsule 46 impinges upon a solid stationary contact-member (not shown), the movable arm 44 continues to move downwardly, and the spiral spring seats levelly upon the top of the capsule, preventing any rocking of the capsule within the opening 45 in the arm 44. The electric current of the contact made by the capsule 46 may be carried by means of a flexible pigtail 50.

In Fig. 5, I have shown a type of contact-device which is particularly efficacious in preventing bouncing, in a construction having a horizontally operated contact, as distinguished from the vertically operated contacts of the preceding figures. The movable contact-carrying arm 51 is vertically mounted, and is perforated, at 52, to receive a frusto-conical capsule 53 which, except for its frusto-conical shape, is similar to the previously described capsules 16, 34 and 46, that is, it comprises a thin-walled, light-weight container about 90 percent filled with crushed tungsten powder, in a preferred form of embodiment. The small end of the capsule 53 is the front (or contact-making) end, and it is shouldered, at 54, to receive the small end of a non-wobblingly seated frusto-conical spring 55, the large end of which abuts against the front side of the movable arm 51. The back end of the capsule 53 has an enlargement or shoulder 56 which abuts against the back side of the movable arm 51.

The conical shape of the capsule 53 shown in Fig. 5 is used so that the powder will wedge into the reduced section when subject to an impact. This results in a wedging action, in addition to the sliding of particles on one another due to the shaking, absorbing more of the kinetic energy of the impact, and resulting in a more bounce-free contact.

The conical capsule-shape of Fig. 5 has a further advantage of increasing the clearance between the capsule 53 and the hole 52, when the contact-arm moves in the direction to compress the spring 55 upon impact of the small end of the capsule 53 with a stationary contact (not shown). This is important because any sliding or rocking contact of the capsule 53 in the hole 52 results in a minute bounce. The frusto-conical spring 55, applying pressure as close to the contact-surface as possible, aids in isolating the capsule 53 from the guiding action of the hole 52.

The particular form of contact-member 53 shown in Fig. 5, as just described, has been found to be practically bounce-free when horizontally operated (as in the position shown), with a very weak spring 55. When vertically operated, with the small end downward, the capsule 53 gives only fair performance because the wedged particles do not have a chance to unpack between each operation. Excellent performance is obtained, however, when the beam 51 is brought to a stop, at the limit of its movement, with sufficient impact to agitate the tungsten particles, as is the case with the impedance relay shown in Fig. 1.

In order to make the conically shaped capsule function properly when mounted for vertical operation, it is desirable to resort to a somewhat different type of construction, one form of which is shown in Fig. 6.

In Fig. 6, the movable arm 61, capsule 63 and spring 65 are the same as the corresponding parts 51, 53 and 55 in Fig. 5, except that the arm 61 is horizontally mounted, so that the relatively movable parts move vertically, with the small end of the capsule 63 downward. To prevent bouncing of the contact-member or capsule 63, because of the packing of the powder therein, I place, over the upper end 66 of the capsule, a spring-washer 67 or other means for providing two oppositely inclined, relatively stiff, spring-fingers 68 and 69. The spring-fingers are surmounted by a mass or weight 70, which may be a light capsule substantially filled with powder, but which usually operates very well when in the form of a plain mass without any friction-material in it. The mass 70 is supported in any way so as to be movable in a vertical direction on top of the spring-washer 67, as by means of a guiding-frame 71. The mass 70 may also be yieldably pressed downwardly by means of a helical spring 72.

In operation, when the capsule 63 of Fig. 6 moves downwardly into contact with the stationary contact (not shown), there is a tendency for the capsule to bounce, and since the powder becomes packed in the small end of the capsule, the impact-energy (which causes bouncing) is not absorbed by the powder in this embodiment as well as in other embodiments of my invention. Before bouncing of the capsule 63 can happen, however, the top mass 70 is exerting almost its maximum pressure on the capsule, through the short, stiff, oppositely inclined springs 68, 69. This pressure is greater than the rebound energy in the lower capsule 63, and the contacts stay closed.

As the spring-fingers 68, 69 flex, under the pressure of the weight 70 upon impact, they slide frictionally, and their friction hastens the application of pressure to the capsule 63. The friction of the fingers 68, 69 absorbs some of the impact-energy of the weight 70, and the time-constant of the spring-mass combination 68, 69, 70 is longer than that of the capsules 63 with its spring 65, so that the impact-pressure of the mass 70 keeps up, on the capsule 63, until there is no further tendency for the capsule to bounce. When the spring-fingers finally begin to flex back, lifting the mass 70 after the impact, their friction (due to sliding) retards the reduction of the pressure on the top of the capsule 63. The top mass 70 finally may, and usually does, jump clear of the spring-fingers 68, 69, but the capsule 63 is by then readjusted from the distortions produced by its impact, and it is held firmly in contact with the stationary contact-member (not shown) by its own spring 65.

It is also possible, in my Fig. 6 construction, to utilize a solid (or friction-free) contact-member or pill in place of a powder-filled capsule 63, relying altogether upon the spring-mass combination 68, 69, 70 to prevent, or to sufficiently limit, the bouncing of the pill, but I believe that it will usually be desirable to construct the pill as a light-weight capsule filled (to at least about nine-tenths capacity) with a heavy powder such as tungsten.

Theory and test both indicate that the low-bounce contact-mechanism of Fig. 6 is an excellent means for preventing bouncing of contacts which are to have a very positive circuit-closing operation. This form of my invention is somewhat more complicated, however, and requires about twice as much available energy to operate it, as compared with the simpler forms which I have illustrated in the preceding figures.

In Figs. 7 to 9, a preferred form of embodiment of my invention is shown in connection with a contactor switch of a type having an operating coil or solenoid 74 operating on a plunger 75 which constitutes the movable operating element of the contactor switch. The switch comprises a front or "make" stationary contact-member 76 and a back or "break" stationary contact-member 77. Cooperating with said two stationary contact-members is a movable contact-member 78 which is mounted on a special compound spring 79 in the following manner. The spring 79 is a leaf-spring having one portion thereof, illustrated as the right-hand end 80, clamped, in cantilever fashion, in a fixed support 81. The other end of the spring is movable in a substantially rectilinear direction between the two stationary contact-members 76 and 77. Between the two ends of the spring 79, the central portion of the spring-material is slitted or cut away leaving two spring-arms 82.

At the extreme left-hand end of the spring 79 there is a backwardly directed tab or auxiliary leaf-spring portion 83 which extends toward the fixedly supported end 80, between the two spring-arms 82. The free or right-hand end of this backwardly extending auxiliary leaf-spring portion 83 carries the movable contact-member 78.

A preferred form of movable contact-member 78 is also shown in Figs. 7 to 9. In this form of embodiment of my invention the movable contact-member 78 is double, consisting of two thin-walled, light-weight silver cups 85 and 86 which are preferably formed of extruded, fine-drawn silver which is kept as hard as possible. These cups 85 and 86 are first sifted full of crushed tungsten powder 88 (Fig. 9), and are then soldered to the right-hand end of the auxiliary leaf-spring portion 83, one on the top and the other on the bottom, so that the leaf-spring constitutes a partition which separates the entire capsule-space of the movable contact-member into separate top and bottom compartments. The portion of the leaf-spring 83 between the two contact-cups 85 and 86 may be either imperforate or perforated. In general, better damping seems to be obtained the longer the contact-container is, in the line of motion, and to this end it is desirable, but not necessary, to provide a communicating opening in the leaf-spring 83 between the two contact-cups 85 and 86.

As shown in Fig. 8, the movement of the movable actuating element 75 is communicated to the leaf-spring 79 in a novel manner which contributes to the substantially bounce-free operation of the electrical contact-members. The operating force of the movable operating element 75 is applied to the leaf-spring 79 at an intermediate point 89 which is spaced from both the stationary support 81 and the movable contact-member 78. Preferably a bend or ridge is formed in the leaf-spring 79 at the intermediate point 89 to insure that the operative contact is always made at a precisely predetermined point.

It is very desirable that the moving-armature 75, and a depending stem 90 carried thereby, shall move free of the spring 79 when the armature 75 reaches the bottom of its downward movement, so that when the back contact 86—77 is made, upon the deenergization of the solenoid 74, the resilient stress which is set up in the spring 79 will bring the movable contact-member 78 into engagement with the stationary contact-member 77, and will then stop, while the solenoid-plunger 75 continues to fall, under the influence of gravity. In this way it is not necessary to dampen the bouncing or vibration of the downward movement of the plunger 75. In the particular embodiment illustrated in Fig. 8, this lost-motion connection between the solenoid-plunger 75 and the spring 79 is achieved by means of a light-weight, shouldered spool 91 which is loosely carried by the depending pin 90. In the particular embodiment shown, bottom stops are provided for both the plunger 75 and the spool 91, as indicated at 92 and 93, respectively, although I wish it to be definitely understood that these precise structural forms are subject to considerable variation, without departing from the essential idea of my invention.

When the solenoid 74 of Fig. 8 is deenergized, the solenoid-plunger 75 rests on its back-stop 92; and the slidable spool 91 rests upon its back-stop 93 so that its shoulders are out of contact with the two spring-arms 82. In this condition of the contactor switch, the bottom cup 86 of the movable contact-member 78 is in engagement with the back stationary contact-member 77, being held in engagement therewith by a slight bias or set-up in the spring 79. At the same time, the top cup 85 of the movable contact-member 78 is spaced slightly from the top or front stationary contact-member 76.

When the solenoid 74 is sufficiently energized, it draws up its plunger 75, the latter carrying with it the depending pin 90 which is firmly secured thereto; and after this pin has moved a short way, its head 94, which is secured on its bottom end, comes into contact with the spool 91 and begins to lift the spool; and after a short movement of the spool 91, said spool makes contact with the bump 89 in the spring 79 and flexes the spring upwardly, causing the back-contact 86—77 to be broken and the front-contact 85—76 to be made.

The compound construction of the spring 79, in the contactor switch of Figs. 7 to 9, results in holding the movable contact-member 78 vertical, in its proper alignment, without tipping, when pressure is applied through the spring, because the angular flexure of the auxiliary leaf-spring portion 83 is substantially equal and opposite to the angular flexure of the main leaf-spring portion 82, so that the base of the movable contact-member 78 always remains parallel to itself, in all positions of the spring. This type of spring has been found to be particularly effective in connection with a tungsten-powder-filled capsule-construction of the movable contact-member 78, causing the grains of the tungsten powder to operate very effectively in their frictional rubbing against each other in order to prevent, or substantially prevent, bouncing of the contacts as a result of the impact of the movable contact-member 78 with either one of the stationary contact-members 76 or 77.

After the top cup-element 85 of the movable contact-member 78 has made engagement with the top stationary contact-member 76, the solenoid 74 continues to draw its plunger or armature 75 upwardly for a little way, until the pressure on the spring 79 is sufficient to exactly offset the electrical pull, and as this point is approached, the effective resultant pull tending to move the core 75 gradually decreases so that the upward movement of the core usually ceases finally without any very great shock.

When the solenoid 74 is deenergized after a period of effective energization, that is, when the energization of the solenoid becomes less than an amount sufficient to hold up the plunger 75 against the pull of gravity and the reaction of the spring 79, the core 75 begins to drop and permits the spring 79 to return the movable contact-member 78 to its initial position in engagement with the back contact-member 77, at which time the granules of the tungsten powder within the cups 85 and 86 shift around and effectively dampen the chattering or bouncing of the contact-member 78. The plunger 75, however, continues to drop downwardly, after the back-contact 86—77 has been made, so that even though the downward movement of the plunger is finally checked with a bouncing impact, its bouncing action is not transmitted to the movable contact-member 78 because the stem 90, or the spool 91, is riding free of effective engagement with the spring 79.

In Fig. 10, I have shown my invention applied to a contact-member of a high-speed directional element which is utilized in protective relay systems for protecting transmission lines against faults. Except for the contact mechanism, the directional element is similar to that which is described and claimed in a patent to S. L. Goldsborough No. 1,934,664, granted November 7, 1933, and assigned to the Westinghouse Electric & Manufacturing Company. It comprises a voltage transformer having a so-called "voltage-iron" bundle of laminations 101 which are shown as being arranged to form a core-type transformer, having a primary winding in the form of a coil 102 and a secondary winding in the form of a single loop 103, of aluminum, which loosely encircles one of the legs of the core 101, and which is pivoted in the frame 104 at 105 and 106.

The directional relay element of Fig. 10 also has a galvanometer stator-member 107 in the form of a bundle of iron laminations having two opposite centrally disposed pole-members 108 and 109 which cooperate with a spaced central magnetizable member 110 which is suitably supported in fixed relation to the pole-pieces 108 and 109, by brackets which have been omitted in order to avoid confusion in the drawings. The ends of the central magnetizable member 110 constitute poles which are opposite the pole-pieces 108 and 109 and which are spaced therefrom by air-gaps within which lie reduced portions 111 and 112 of the side pieces of the aluminum loop 103.

One side of the loop 103 has an extension 113 which carries a bent contact-carrying arm 114 which is preferably made of light-weight insulating material, the end of which carries a compound spring-member 115 similar to the spring 79 shown in Fig. 7, said spring-member carrying a tungsten-powder-filled capsule-type movable contact-member 116, as previously described in connection with the electrical contactor switch in Figs. 7 to 9.

The movable contact-member 116 cooperates with a stationary contact-member 117 in the form of a threaded pin which terminates in a knurled nut or knob 118 whereby the separation of the two contact-members 116 and 117 may be adjusted. The threaded pin 117 is carried by a metallic terminal-bar 119 which is rigidly supported by a heavy insulating plate 120 carried by the frame 104.

The galvanometer frame or stator-member 107 has two side-pieces 121 and 122, in addition to the centrally aligned polar members 108 and 109, and the side-arms 121 and 122 carry so-called "current-energized" coils 123 and 124, which produce magnetomotive forces operating in parallel with each other so as to jointly energize the respective pole-pieces 108 and 109.

In operation, the directional element of Fig. 10 works as follows. The voltage coil 102 is energized from the line-voltage and induces a heavy circulating current in the aluminum loop 103, proportional to said line-voltage. The current coils 123 and 124 are energized from the line-current and produce a magnetic field, in the pole-pieces 108 and 109, proportional to said line-current. The coil-sides 111 and 112, carrying voltage-responsive current, and lying transversely across this current-responsive field, produce a torque which is responsive, in direction and magnitude, to the product of the line-voltage, the line-current and the cosine of the phase-angle between the current in the loop 103 and the field-flux traversing the so-called "current" iron 107. My low-bounce contact-member 116 operates in the manner previously described.

By means of the construction shown in Fig. 10, therefore, I have succeeded in producing a directional relay-element which is very sensitive and very quick in its response to the relative directions of the current and voltage in an alternating-current line. In stating that the relay is quick, I am contemplating the total time necessary to make a firm contact 116—117, including the time which would be taken up in bouncing or chattering, in previous designs, but which is substantially eliminated by my low-bounce contact-member 116 with its supporting spring 115. This constitutes a very important field of application of my invention, where the low-bounce characteristic was very greatly needed. It will be noted that the damping qualities of my low-bounce mechanism endures throughout all of the time when there might be a tendency to produce chattering, as distinguished from previous impact-absorbing mechanisms which have been operative to absorb only the shock of the first impact, without having any practical effect thereafter.

To get the best results with my invention, I have found that there are several considerations to be observed in connection with the powdered damping-material. The crushed tungsten granules which I prefer to use are jagged particles having irregular rough surfaces similar, in appearance, to crushed granite, when viewed under a powerful microscope. The jagged particles have a decided advantage over rounded particles or spherical balls, because balls can move in contact with each other with relatively little friction, whereas the rough particles develop relatively great friction resisting the sliding of the particles one against another.

In all damping-constructions, and more particularly in the construction of the contact-making capsules, it is necessary to have the highest possible ratio of damping-material to capsule-material or contact-material, in order to obtain the maximum amount of damping and the best possible performance. For best results, therefore, it is necessary to utilize the lightest possible container or contact-making capsule, and the heaviest possible damping-material.

In checking over the available commercial materials which possess high density, surface-hardness, mechanical strength, rough cleavage-surface configuration, chemical stability, and high softening-temperature, I have found that tungsten is outstanding. There are only a few known denser materials, but they are definitely not in the commercially practicable price-class, nor do they possess the other desired characteristics. Obviously, some alloy of tungsten would probably serve quite as well as the pure material, provided that the composition were low in the alloying element. Of course a less expensive granular material may be utilized, if necessary, at a sacrifice in efficiency.

In speaking of tungsten powder, I mean powdered tungsten, or an alloy which is predominantly tungsten, having particles of adequate mechanical strength, such as crushed tungsten powder. I have found that chemically reduced tungsten powder is porous, quite similar to a sponge in appearance, under the microscope, so that it is of such very low mechanical strength that it would soon pulverize in service, besides having a prohibitively low density, from the standpoint of obtaining anything like reasonably good damping.

In order to obtain the best results, it is necessary to pay some attention to the matter of grain-size, or to the range of grain-sizes to be used for the powdered damping-material. If the grain-size is relatively large, the volume-density (mass per unit volume of the powdered material) will be high, which is desirable, but if the grains are too very large, they will not readily shift, for a given severity of jarring, and there will not be a sufficient number of rubbing-surfaces to develop a large total aggregate frictional force. On the other hand, if the grain-size is small, the volume-density will be low, and if the grains are too very small, the powdered material will pack too compactly, so that the particles will not readily shift over each other in response to jarring, and hence will not develop the adequate friction which is needed if damping is to be obtained. It is obviously necessary, for best results, to choose particle-sizes which will be neither too large nor too small.

After considerable experimental work, particularly on contact-making capsules of .48 cm. diameter, or say a half of a centimeter average-diameter, a powder having a sifted density (grams per cubic centimeter) of approximately 7.5 has been evolved, which gives perfect results, such that repeated high-speed oscillograms do not show the slightest trace of a bounce. While this volume-density of the powder is far removed from the 19.2 density of solid tungsten, it represents the best obtainable damping-material for small contact-capsules not exceeding 0.5 centimeter average-diameter. It should be understood, however, that my preferred grain-size is not the only grain-size which would give very satisfactory performance, even though I believe that my preferred powder is the best for my particular purpose, that is, for silver contact-making capsules of 0.48 centimeter diameter, having an average wall-thickness of the order of 0.06 millimeter, mounted on a spring which provides a .06-gram contact-pressure.

Since the optimum particle-size depends upon a number of variables, including the size of the container, the amount or severity of the jarring or deceleration, and the total mass to be controlled, it is really necessary, if the most absolutely perfect, obtainable damping is to be discovered, to make a careful series of high-speed oscillographic studies for each different job or application on which my invention is to be utilized. It should be realized, however, that I am now talking about the choice between a condition in which repeated tests will show no slightest trace of a chatter, and a condition in which an occasional slight single chatter, or tiny rebound, may be obtained, which may frequently be tolerated, and which would still be a very great improvement over the prior art.

Although, in the broader aspects of my invention, at least, I am not limited to any particular size of particles, the powder which I have chosen for my particular application of the invention, as above described, may be more particularly specified as follows. Crushed tungsten powder is sieved through 150, 200 and 250-mesh sieves, and the 150–200 mesh material and the 200–250 mesh material are saved in separate moisture-proof jars. Material remaining on the 150-mesh screen is recrushed until it all passes through a 150-mesh sieve. That which then remains on the 200-mesh screen is preserved as the so-called 150–200 mesh material. That portion of the residue which remains on the 250-mesh screen is preserved as the so-called 200–250 mesh material. Material which passes through the 250-mesh screen is scrapped, so far as my present invention is concerned. Equal weights of the 150–200 mesh and 200–250 mesh powders are then thoroughly mixed and stored in moisture-proof jars until needed for assembly in the non-bouncing contact-assemblies of my invention. The screens or sieves referred to may be further specified as follows:

150 mesh  0.0041" opening  0.0026" screen wire
200 mesh  0.0029" opening  0.0021" screen wire
250 mesh  0.0024" opening  0.0016" screen wire In choosing the grain-sizes, it should be noted that there is an advantage in a grain-size which gives as high a density as possible, which usually means that much of the total mass of powder is in as large a size as is compatible with obtaining a good damping-friction. In this connection, I have found that the container or capsule imposes an important limitation on the density of the damping-powder, requiring a high density of powder, because the lower the powder-density the larger the container must be, and hence the container-walls must be considerably thickened in order to maintain the necessary rigidity in the larger size. This means that the ratio between the mass of the powder and the mass of the container (and hence the efficiency of the damping) begins to decrease rapidly as the density of the powder is decreased, so that the container can readily get prohibitively heavy (if even fairly good freedom from contact-chattering is desired), if an attempt is made to utilize a damping-powder having a much lower density than my preferred powder as above described. The significance of the foregoing discussion of the container-wall thickness will perhaps be better appreciated when it is noted that I prefer to utilize a paper-thin silver contact-capsule having a side-wall thickness of the order of 0.06 millimeter.

While I have described and illustrated my invention in several preferred forms of embodiment, I desire that such description and illustrations shall be taken in an illustrative sense rather than in a limiting sense, as it will be obvious that many changes and substitutions may be made with respect to the precise details of embodiment, for carrying out my invention, without departing from the essential spirit and scope thereof. I desire, therefore, that the appended claims shall be accorded the broadest interpretation consistent with their language and the prior art.

I claim as my invention:

1. An electric contact-make-and-break device having a movable element, actuating-means and stop-means therefor, said movable element having a chamber-portion, and tungsten powder held within said chamber-portion, said actuating-means and stop-means being of such nature as to cause a sufficiently sudden change in motion to develop a material amount of damping by friction as a result of tungsten grains shifting against each other under the operating conditions of said device.

2. An electric contact-make-and-break device having a movable element, actuating-means and stop-means therefor, said movable element having a chamber-portion, and a flowable material held within said chamber-portion and consisting of a large number of separate molecular aggregates which are free of solid attachment to each other, and which are capable of frictionally shifting with respect to one another when jarred, said actuating-means and stop-means being of such nature as to cause a sufficiently sudden change in motion to develop a material amount of damping by friction as a result of molecular aggregates shifting against each other under the operating conditions of said device, in combination with a movable inertia-member, means for mounting said movable inertia-member on said movable element in a position back of said chamber-portion and with a limited freedom of movement-component in the same direction as said chamber-portion, and spring-means having a frictional sliding contact between two separate, relatively moving parts, said spring-means being interposed between said movable inertia-member and said chamber-portion and having sufficient stiffness to cause the reaction of the movable inertia-member to be slower than the reaction of the flowable material within the chamber-portion, upon an impact of the movable element with its stop-means.

3. An electric contact-make-and-break device having a movable element, a movable contact-member comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, means for mounting said chamber-portion on said movable element in such manner as to have some freedom of movement with respect to said movable element, and a stationary contact-member comprising substantially non-yielding stop-means against which the contact-tip of said chamber-portion impacts.

4. An electric contact-make-and-break device having a movable element, a movable contact-member comprising a chamber-portion having a contact-tip of conducting material, a loose granular material of hard metal powdered particles, having a density at least as great as iron, held within said chamber-portion, means for mounting said chamber-portion on said movable element in such manner as to have some freedom of movement with respect to said movable element, and a stationary contact-member comprising substantially non-yielding stop-means against which the contact-tip of said chamber-portion impacts.

5. The invention as defined in claim 3, characterized by said chamber-portion mounting means comprising a compound leaf-spring having a main leaf-spring portion supported by said movable element in cantilever fashion at a first part of its length, a second part of the length of said main leaf-spring portion being movable in contact-making and contact-breaking directions relatively to said stationary contact-member, said compound leaf-spring also having a shorter auxiliary leaf-spring portion supported at said second part of the length of said main leaf-spring portion and extending back towards said first part of the length of said main leaf-spring portion, said movable contact-member being mounted on, and entirely supported by, said auxiliary leaf-spring portion at a point removed from the point of support of said auxiliary leaf-spring portion.

6. A movable element having a chamber-portion, and tungsten powder held within said chamber-portion, the condition of motion of said movable element being of such nature as to cause a sufficiently sudden change in motion to develop a material amount of damping by friction as a result of tungsten grains shifting against each other under the operating conditions of said movable element.

7. Mechanism having a movable element, actuating-means and stop-means therefor, said movable element having a chamber-portion, and tungsten powder held within said chamber-portion, said actuating-means and stop-means being of such nature as to cause a sufficiently sudden change in motion to develop a material amount of damping by friction as a result of tungsten grains shifting against each other under the operating conditions of said movable element.

8. An electric contact-make-and-break device having a movable element, a movable contact-member comprising a metal chamber-portion constituting the movable contact-making member of the device, tungsten powder held within said chamber-portion, means for mounting said chamber-portion on said movable element in such manner as to have some freedom of movement with respect to said movable element, and a stationary contact-member comprising substantially non-yielding stop-means against which the contact-tip of said chamber-portion impacts.

9. The invention as defined in claim 1, characterized by said powder being of such coarseness that practically all of it would remain on a 250-mesh screen.

10. The invention as defined in claim 6, characterized by said powder being of such coarseness that practically all of it would remain on a 250-mesh screen.

11. The invention as defined in claim 7, characterized by said powder being of such coarseness that practically all of it would remain on a 250-mesh screen.

12. The invention as defined in claim 8, characterized by said powder being of such coarseness that practically all of it would remain on a 250-mesh screen.

13. The invention as defined in claim 8, characterized by said powder being of such coarseness that practically all of it would remain on a 250-mesh screen, and said powder being of such fineness that it would pass through a 150-mesh screen.

14. An electric contact-make-and-break device comprising a substantially non-yielding stationary contact-member, a movable contact-member, a movable operating-member, and spring-means for providing a yieldable connection between said movable contact-member and said movable operating-member, said movable contact-member comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, and said spring-means comprising a plurality of oppositely flexing spring-portions so arranged as to substantially prevent any tilting of the movable contact-member and any rubbing of the movable contact-member over the stationary contact-member after the first contact between the two and while the movable operating-member is still moving in a direction such as to flex said spring-means after said contact has been made.

15. An electric contact-make-and-break device comprising a substantially non-yielding stationary contact-member, a movable contact-member, a movable operating-member, and spring-means for providing a yieldable connection between said movable contact-member and said movable operating-member, said movable contact-member comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, and said spring-means comprising a sheet-metal spring-member slitted to provide a plurality of oppositely flexing spring-portions, including bifurcated means, and so arranged as to substantially prevent any tilting of the movable contact-member and any rubbing of the movable contact-member over the stationary contact-member after the first contact between the two and while the movable operating-member is still moving in a direction such as to flex said spring-means after said contact has been made.

16. An electric contact-make-and-break device comprising a substantially non-yielding stationary contacting-member, a flexible leaf-spring mounted at one end and having its other end free, said free end being movable in contact-making-and-breaking direction with respect to said stationary contact-member, and a movable contact-member mounted on a portion of said free end, said movable contact-member comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, and said portion of the free end of the leaf-spring being one of a plurality of oppositely flexing spring-portions, including bifurcated means, and so arranged as to substantially prevent any tilting of the movable contact-member and any rubbing of the movable contact-member over the stationary contact-member after the first contact between the two and while the movable operating-member is still moving in a direction such as to flex said spring-means after said contact has been made.

17. An electric contact-make-and-break device comprising a stationary contact-member, a movable contact-member, a movable operating-member, and spring-means associated with one of said contact-members, said one of the contact-members comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, and said spring-means comprising a plurality of oppositely flexing spring-portions so arranged as to substantially prevent any tilting of its associated contact-member and any rubbing of its associated contact-member over the other contact-member after the first contact between the two and while the movable operating-member is still moving in a direction such as to flex said spring-means after said contact has been made.

18. An electric contact-make-and-break device comprising a stationary contact-member, a movable contact-member, a movable operating-member, and spring-means associated with one of said contact-members, said one of the contact-members comprising a chamber-portion having a contact-tip of conducting material, a flowable material held within said chamber-portion and consisting of a large number of separate molecular aggregates which are free of solid attachment to each other, and which are capable of frictionally shifting with respect to one another when jarred, and said spring-means comprising a sheet-metal spring-member slitted to provide a plurality of oppositely flexing spring-portions, including bifurcated means, and so arranged as to substantially prevent any tilting of its associated contact-member and any rubbing of its associated contact-member over the other contact-member after the first contact between the two and while the movable operating-member is still moving in a direction such as to flex said spring-means after said contact has been made.

WELTON V. JOHNSON.